(12) United States Patent
Hesselbarth et al.

(10) Patent No.: US 10,442,553 B2
(45) Date of Patent: Oct. 15, 2019

(54) WINGLESS AIRCRAFT

(71) Applicant: Spherie UG (haftungsbeschränkt), Hamburg (DE)

(72) Inventors: Jonathan Hesselbarth, Darmstadt (DE); Nicolas Chibac, Hamburg (DE)

(73) Assignee: Spherie UG (haftungsbeschränkt), Hamburg (DE)

( * ) Notice: Subject to any disclaimer, the term of this patent is extended or adjusted under 35 U.S.C. 154(b) by 0 days.

(21) Appl. No.: 15/774,042

(22) PCT Filed: Nov. 1, 2016

(86) PCT No.: PCT/EP2016/076307
§ 371 (c)(1),
(2) Date: Aug. 21, 2018

(87) PCT Pub. No.: WO2017/076837
PCT Pub. Date: May 11, 2017

(65) Prior Publication Data
US 2019/0118969 A1    Apr. 25, 2019

(30) Foreign Application Priority Data

Nov. 6, 2015 (DE) .......... 10 2015 119 065

(51) Int. Cl.
*B64D 47/08* (2006.01)
*B64C 39/02* (2006.01)
*H04N 5/247* (2006.01)
*B64C 27/08* (2006.01)
(Continued)

(52) U.S. Cl.
CPC .............. *B64D 47/08* (2013.01); *B64C 27/08* (2013.01); *B64C 39/024* (2013.01); *G03B 15/006* (2013.01); *H04N 5/247* (2013.01); *B64C 2201/027* (2013.01); *B64C 2201/042* (2013.01); *B64C 2201/108* (2013.01); *B64C 2201/127* (2013.01); *H04N 5/23238* (2013.01)

(58) Field of Classification Search
None
See application file for complete search history.

(56) References Cited

U.S. PATENT DOCUMENTS 2,651,480 A * 9/1953 Pullin ..................... B64C 27/08
244/17.17
9,350,954 B2 * 5/2016 Wagreich ............. G05D 1/0038
(Continued)

*Primary Examiner* — William B Perkey
(74) *Attorney, Agent, or Firm* — Smartpat PLC

(57) ABSTRACT

The invention relates to a wingless aircraft (1) having a plurality of lifting rotors (3) which are driven by electric motor and rotate about various rotor axes (2). The aircraft (1) has at least one energy store (21) for making available the electrical energy necessary to operate the lifting rotors (3), at least one control device (22) for actuating the lifting rotors (3) and for communication with a ground station and at least two camera devices (4) for detecting a panorama image. An extremely small, spherical rotor envelope (5) which encloses all the lifting rotors (3) has a larger volume than an extremely small spherical camera envelope (6) which encloses camera lenses (7) of all the camera devices (4). The camera devices (4) extend over a field of vision, wherein the field of vision surrounds the entire aircraft (1), and wherein the lifting rotors (3) lie outside the field of vision.

16 Claims, 10 Drawing Sheets

(51) Int. Cl.
    *G03B 15/00*     (2006.01)
    *H04N 5/232*    (2006.01)

(56) References Cited

U.S. PATENT DOCUMENTS

| | | | |
|---|---|---|---|
| 2006/0144994 A1* | 7/2006 | Spirov | B60V 1/06 244/62 |
| 2012/0083945 A1* | 4/2012 | Oakley | B64C 27/08 701/2 |
| 2012/0303179 A1* | 11/2012 | Schempf | B25J 11/002 701/2 |
| 2013/0223833 A1* | 8/2013 | Tenenbaum | G03B 17/02 396/419 |
| 2015/0316927 A1* | 11/2015 | Kim | G03B 15/006 701/2 |
| 2015/0321758 A1* | 11/2015 | Sarna, II | G05D 1/0011 244/63 |
| 2016/0291445 A1* | 10/2016 | Fisher, Sr. | G03B 15/006 |
| 2016/0291598 A1* | 10/2016 | Youmans | B64C 17/02 |
| 2016/0347443 A1* | 12/2016 | Lee | B64C 39/024 |
| 2017/0085840 A1* | 3/2017 | Mizushina | H04N 5/2257 |
| 2017/0201738 A1* | 7/2017 | Lacaze | G01S 17/89 |

\* cited by examiner

WINGLESS AIRCRAFT

TECHNICAL FIELD

The invention relates to a wingless aircraft with multiple lift rotors, driven by electric motors and rotating around various rotor axes, wherein the aircraft comprises at least one energy storage for providing the electrical energy necessary to operate the lift rotors, at least one control device for actuating the lift rotors and for communicating with a ground station, and at least two camera devices to capture a panoramic image.

BACKGROUND

Such unmanned aircraft, remotely controlled from the ground station, such as for example quadcopters, are used to take panoramic aerial images. For this purpose, in known aircraft usually multiple camera devices are arranged on a frame of the aircraft, wherein the camera devices, if possible, are arranged in such a way that fields of vision of the camera devices overlap one another at a distance to the aircraft, in order to allow for the imaging of the entire surroundings of the aircraft. In addition, it must be ensured that no components of the aircraft are located within the fields of vision of the camera devices, in order to not impair the panoramic image around the aircraft. In order to achieve this, the camera devices are usually, if possible, arranged as far to the outside on the aircraft as possible, so that the remaining components of the aircraft are possibly arranged behind the respective camera device.

The aircraft known from the prior art having camera devices for capturing the entire surroundings of the aircraft are best suited to create panoramic images of the environment from greater distances to the aircraft. The nearer the objects to be imaged in the environment come closer to the aircraft, the more difficult the imaging with the aircraft known from the prior art, as the different fields of vision of the camera devices intersect with one another only at a considerable distance to the aircraft, due to the spaced arrangement of the camera devices to one another, and form a visual area surrounding the entire aircraft in which all of the objects can be entirely imaged. Capturing and creation of panoramic images of the environment can however exclusively occur at the distance to the aircraft, in which the surroundings are entirely imaged and in which therefore, the fields of vision of the various camera devices in each case intersect one another.

For this reason, aircraft known from the prior art are not suited to capture and create panoramic images, for example in case of a closer fly-by to a building, in a fly-through among buildings or for example also through forests or the like, as in such imaging, the objects to be captured are regularly found outside the field of vision of the camera, so that these objects can each only partially be imaged, and the capture of a complete panoramic image of the entire surroundings of the aircraft at every point in time of the fly-by is not possible or only possible to a limited extent.

The field of vision of a camera device refers to the area or the volume of the object space or of the surroundings of the aircraft which can be captured with the camera device. When using a camera device with a rectangular photo sensor, the field of vision of the camera device is shaped like a truncated pyramid, wherein a tip of the pyramid is located in the focal point of the camera device on the objective side.

It is considered the object of the invention to further develop the aircraft known from prior art in such a way that as complete as possible depictions of the environment or panoramic images are also possible in the case of fly-bys as close to objects as possible.

SUMMARY

According to the invention, this object is achieved in that a smallest, spherical rotor envelope enclosing all of the lift rotors has a greater volume than a smallest, spherical camera envelope enclosing the camera lenses of all of the camera devices, and in that the camera devices span a visual area, wherein the visual area surrounds the entire aircraft, and wherein the lift rotors are located outside of the visual area. By using such a specially-designed aircraft, in which the lift rotors are located further outside, for example arranged on a frame of the aircraft, the camera devices can be arranged as to be closer to one another, whereby the fields of vision of the various camera devices of the aircraft intersect with one another at a smaller distance to the aircraft. In this particular construction it is required to adapt the arrangement of the lift rotors to the required arrangement of the camera devices. Therefore, a construction of the aircraft that in each case is adapted to the camera devices used, is necessary.

Advantageously, in the aircraft according to the invention, the visual area at least partially surrounds the aircraft. According to the invention, in order to also be able to generate panoramic images of the complete environment of the aircraft, it is provided according to the invention for the visual area to surround the entire aircraft.

The efficiency of the lift rotors rises with increasing rotor surface area. In order to be able to design the rotor surface of the lift rotors as large as possible, and at the same time to be able to arrange them outside of the fields of vision of the camera devices, it is provided according to the invention to determine the visual area that can be captured by the camera devices or by the fields of vision of the camera devices. The visual area results from the fields of vision intersecting with one another. With the help of or in place of the field of vision, it is readily also possible to determine the blind space, which cannot be captured by any of the camera devices. In the case of fields of vision in the shape of a truncated pyramid, the blind space forms a non-convex body with multiple curved lateral surfaces which acutely converge on one another in corner regions of the body. Here, the lift rotors are advantageously arranged in the as far out as possible outside regions, which usually are the acutely-converging corner regions of the blind space that cannot be captured by the camera devices.

According to the invention, it is advantageously provided that the camera devices comprise cameras for capturing monoscopic images and/or cameras for capturing stereoscopic images. For example, the camera devices may comprise camera arrays consisting of in each case at least two cameras, arranged spaced from one another, by means of which stereoscopic images of the surroundings of the aircraft can be produced. The use of such camera devices for capturing stereoscopic images allows for the determination of three-dimensional space information. The stereoscopic images can be used to generate virtual-reality representations of the environment. In addition, it is possible, with the aircraft according to the invention, to use the aircraft for 3D-measurement of the environment, with the help of photogrammic processes, when using camera devices which allow for stereoscope images.

In a particularly advantageous configuration of the aircraft according to the invention, it is provided that at least one lens-to-lens distance of two camera devices from one another is less than at least one rotor-to-rotor distance of two rotors from one another. By arranging the camera devices as near to one another as possible, complete panoramic images can also be generated in closer fly-bys to objects.

In order to further enlarge the yet completely-capturable region and to be able to completely capture objects yet closer to the aircraft, it is provided that a smallest, spherical center point envelope enclosing all lift rotor center points, has a greater volume than the smallest spherical camera envelope. The respective center points or centers of gravity are referred to as lift rotor center-points.

In order not to impair the panoramic imaging of the environment, it is provided according to the invention that all components of the aircraft are located outside of the field of vision. By arranging the components, such as for example the required energy storage and the control device, inside the blind space, these components are not captured by the camera devices.

In a particularly advantageous construction of the wingless aircraft, it is provided that the aircraft comprises at least four camera devices, wherein the camera devices are arranged to and oriented to one another such that lens planes parallel to the image planes enclose a convex lens polyhedron, so that each boundary face of the lens polyhedron is located in a lens plane, and lenses of the camera devices are completely within the lens polyhedron. A plane through the camera device is referred to as image plane, in which the image sensor of the camera device is arranged.

Advantageously, it is provided according to the invention that the lift rotors are arranged in a region between the visual area and the convex lens polyhedron. In order to enable a sufficient lift by means of the lift rotors, it is provided according to the invention to arrange the lift rotors in an as great distance from one another as possible, so that as many lift rotors as possible with as large a surface as possible can be arranged on the wingless aircraft.

In order to be able to also take the best possible advantage of the blind space for arranging the lift rotors, it is provided according to the invention, that the lift rotors are arranged to be partially protruding into the region of the convex lens polyhedron. It is also possible, however, and provided according to the invention, that the lift rotors are arranged completely outside of the convex lens polyhedron. In this manner, the part of the blind space enclosed by the convex polyhedron can be particularly simply used to arrange the further components, such as for example the energy storage.

In a particularly advantageous configuration of the wingless aircraft according to the invention, it is provided that the energy storage, the control device and the camera devices are arranged completely within the convex lens polyhedron. Due to the fact that as many components as possible are arranged in close proximity to one another and particularly close to the camera devices in a center of the wingless aircraft, the weight of the components advantageously be used for vibration damping, in order to stabilize the taking of an image via the camera device and to allow for a capturing, if possible without disturbing vibration effects caused by the lift rotors.

For a further-optimized arrangement of the lift rotors in the blind space, and in particular in the acutely-converging regions of the blind space, it is provided according to the invention, that at least two lift rotors are arranged in such a way, that rotor axes of the lift rotors are not oriented parallel to one another. Through such a non-parallel arrangement of the lift rotors to a height axis of the wingless aircraft, the lift rotors can be particularly well-fitted in the acutely-converging regions of the blind space. In addition, such an oblique arrangement of the lift rotors, when using at least six lift rotors, allows a lateral acceleration as well as lateral deceleration of the aircraft. The aircraft can thereby be steered in desired directions, without tilting around a yaw axis of the aircraft. In this manner, a setting angle of the camera devices with respect to the yaw axis of the aircraft can respectively be kept constant. With aircraft known from prior art, typically complex cardanic gimbals with electric servo motors are used to that end, on which the camera devices are mounted.

For the arrangement of the various components of the wingless aircraft relative to one another, it is provided that the lift rotors are arranged on an aircraft frame of the aircraft. The aircraft frame advantageously consists of profiles, and depending on the manner of construction, can be designed to be substantially planar or can also form various complex bodies.

In a particular advantageous configuration of the wingless aircraft, it is provided that the aircraft frame encloses a receiving space, within which the energy storage, the control device and the camera devices are completely arranged. In this construction, the aircraft frame is advantageously designed and arranged in such a way that the aircraft frame is arranged within the blind space. The receiving space can be a substantially cuboid or an arbitrary polyhedron-shaped space. According to the invention, it is provided for the lift rotors of the wingless aircraft to form two mirror-symmetrically arranged groups of lift rotors, wherein lift rotor center points of the lift rotors from a group of lift rotors are in each case located substantially in one lift rotor plane, and wherein the lift rotor planes of the two groups of lift rotors are located substantially parallel to one another and are oriented orthogonal to the height axis of the wingless aircraft. Advantageously, the lift rotors of the two groups of lift rotors are arranged spaced from one another on the aircraft frame on opposite sides of the aircraft frame.

According to the invention, it is advantageously provided that the drive devices of the lift rotors and the lift rotors are rigidly connected to the aircraft. This way, the thrust force generated by the lift rotors can effectively be transmitted to the aircraft frame.

In order to achieve a possibly good damping of vibrations generated by the lift rotors and transmitted to the aircraft frame in the area of the camera devices, it is provided according to the invention for the energy storage, the control device and the camera devices to be secured to the aircraft frame via damping elements. The damping elements can be suitable rubber-elastic elements, for example.

Advantageously, according to the invention, it is provided for the energy storage, the control device and the camera devices to be connected with one another in a rigid manner. This way, these components of the wingless aircraft form a comparatively large, contiguous mass, through which a particularly well vibration damping can be achieved.

Further advantageous embodiments of the wingless aircraft according to the invention are explained in greater detail by means of exemplary embodiments illustrated in the drawing.

BRIEF DESCRIPTION OF THE DRAWINGS

The Figures show:

FIG. 1b is a schematically-illustrated perspective view of the quadcopter illustrated in FIG. 1a.

FIG. 2b is a schematically-illustrated, perspective view of the tricopter illustrated in FIG. 2a.

FIG. 3b is a schematically-illustrated perspective view of the octocopter illustrated in FIG. 3a.

FIG. 4b is a schematically-illustrated perspective view of the aircraft illustrated in FIG. 4a.

DETAILED DESCRIPTION

Figure 1A:
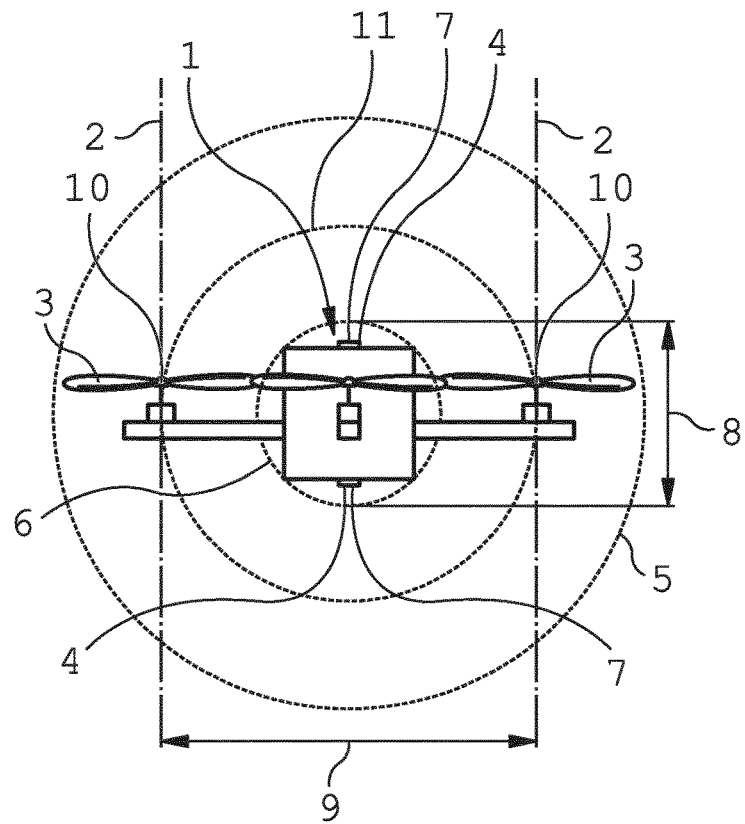
FIG. 1a is a schematically-illustrated side view of a quadcopter having two camera devices.
Figure 1B:
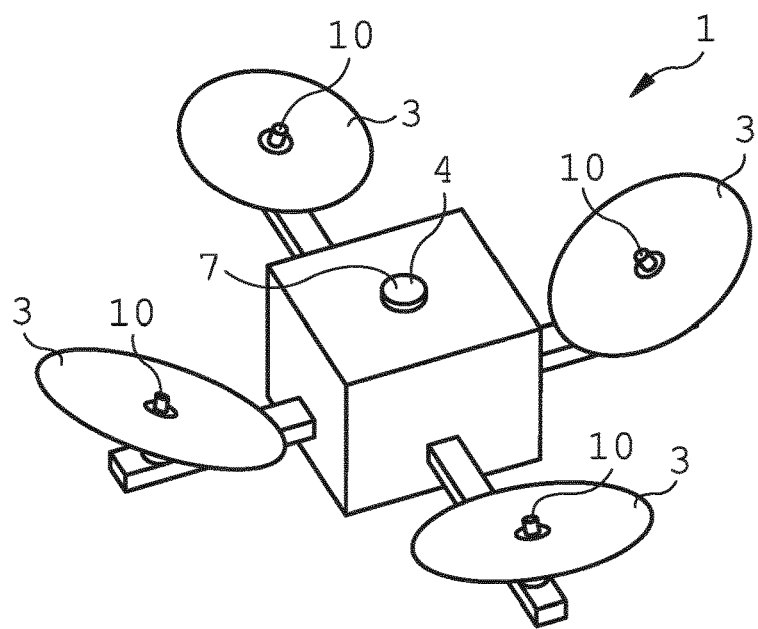

FIGS. 1a and 1b schematically illustrate a wingless aircraft 1 having four lift rotors 3 driven by electric motors and rotating around various motor axes 2. The aircraft comprises two camera devices 4 for capturing a panoramic image.

The camera devices 4 and the lift rotors 3 are arranged and oriented to one another in such a way that a smallest, spherical rotor envelope 5 enclosing all lift rotors 3 has a greater volume than a smallest spherical camera envelope 6 enclosing the camera lenses 7 of all camera devices 4. The camera devices 4 span a visual area, wherein the visual area surrounds the entire aircraft 1, in order to be able to capture the entire surroundings of the aircraft 1. The lift rotors 3 are located outside the visual area. In addition, a lens-to-lens distance 8 of the two camera devices 4 from one another is less than a rotor-to-rotor distance 9 of two oppositely arranged lift rotors 3 from one another. In the aircraft, also a smallest, spherical center point envelope 11 enclosing all lift rotor center points 10 has a greater volume than the smallest spherical camera envelope 6.

Figure 2A:
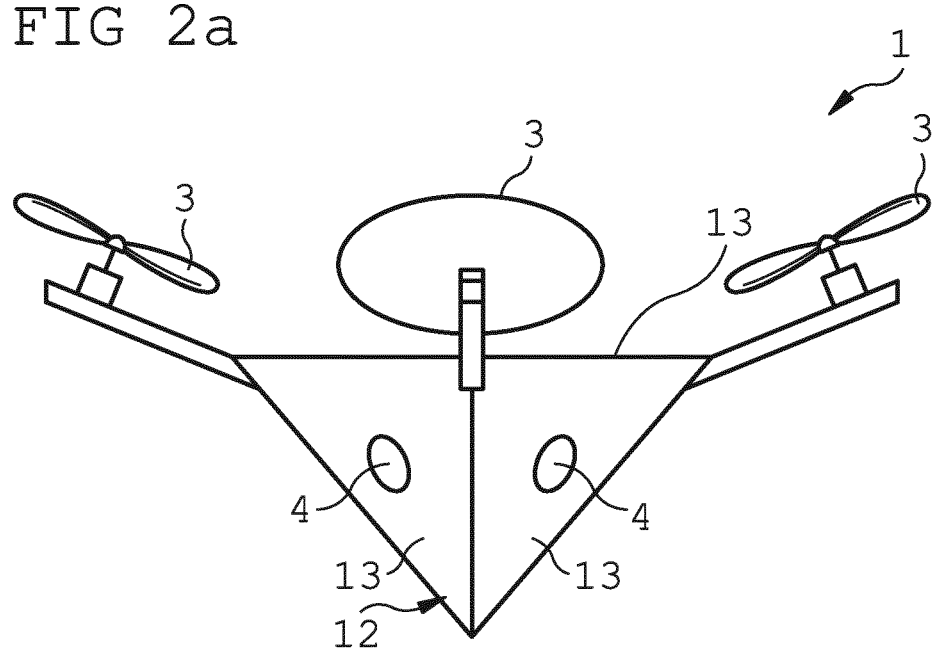
FIG. 2a is a schematically-illustrated side view of a tricopter, wherein four camera devices are arranged in such a way that a lens polyhedron is obtained in a pyramid-shaped manner.
Figure 2B:
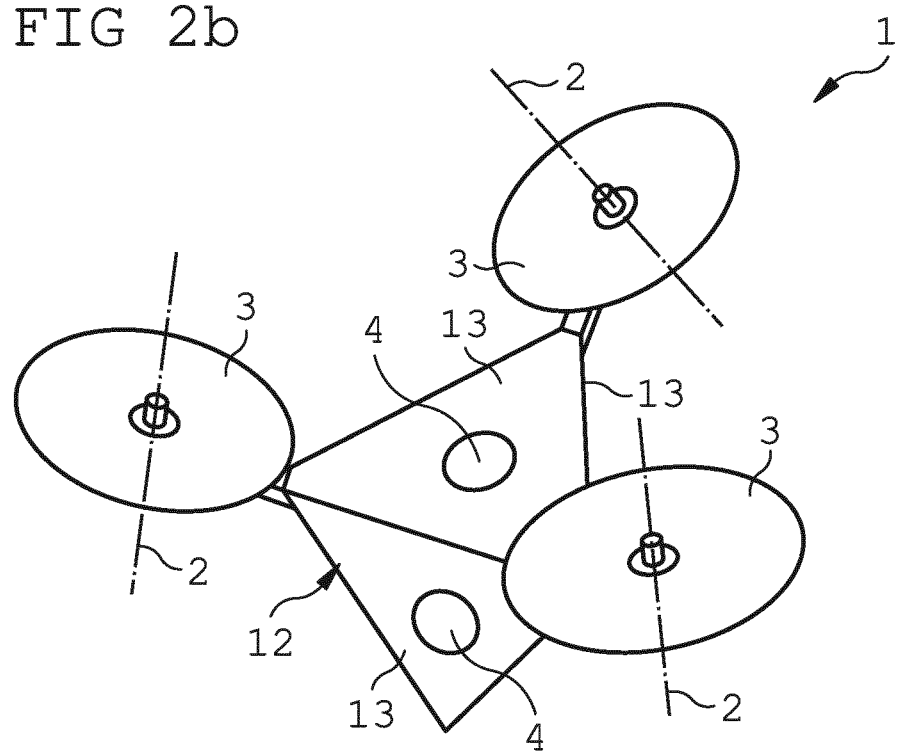

FIGS. 2a and 2b show schematically-illustrated views of a wingless aircraft 1, wherein four camera devices 4 are arranged in such a way that a lens polyhedron 12 comprises four boundary faces 13 and is of pyramid-shaped design. The lift rotors 3 of the wingless aircraft are completely arranged outside the convex lens polyhedron 12. In addition, the lift rotors 4 are arranged in such a way that rotor axes 2 of the lift rotors 4 are not oriented in parallel to one another.

Figure 3A:
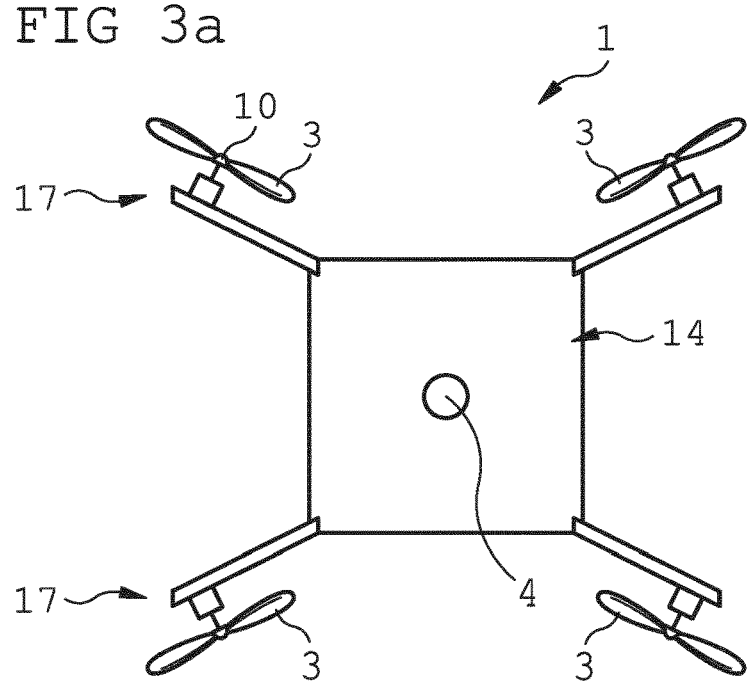
FIG. 3a is a schematically-illustrated side view of an octocopter, wherein six camera devices are arranged in such a way that a lens polyhedron is achieved in a cuboid-shaped manner.
Figure 3B:
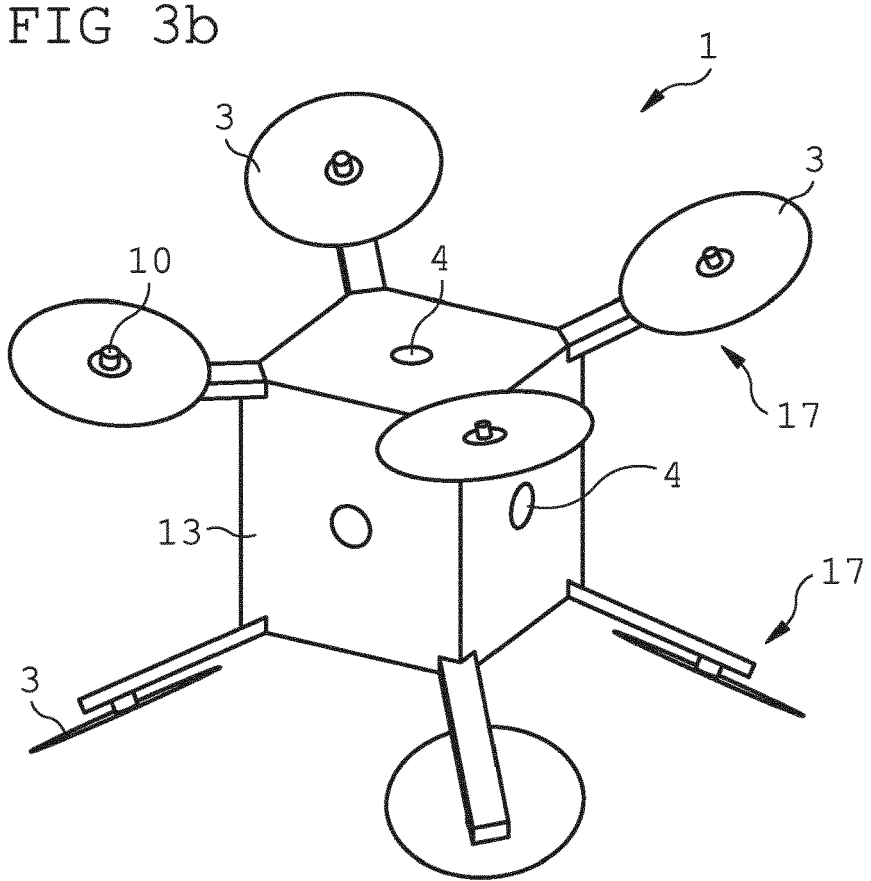
Figure 4A:
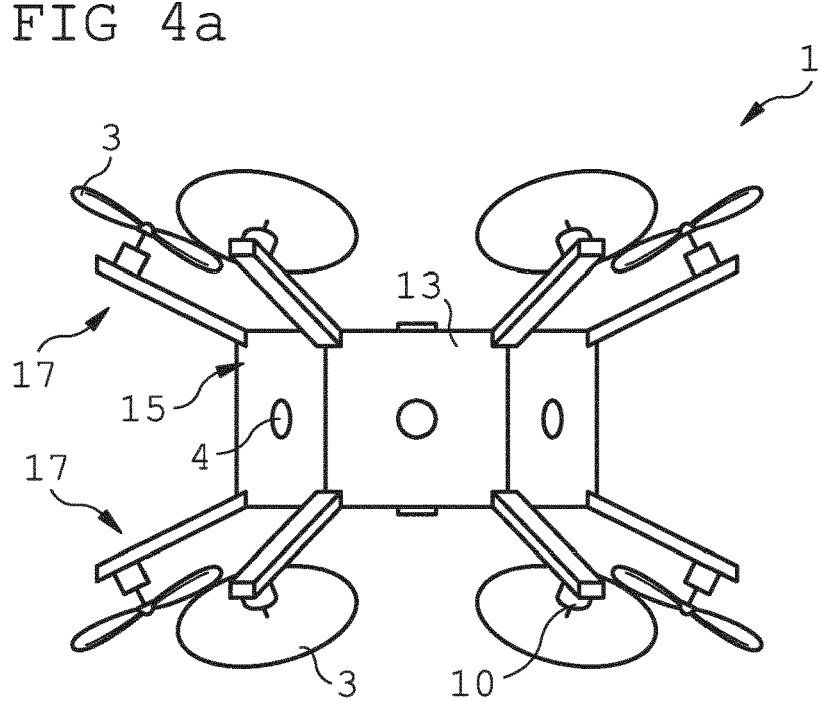
FIG. 4a is a schematically-illustrated side view of a wingless aircraft having twelve lift rotors, wherein eight camera devices are arranged in such a way that a lens polyhedron forms a prism having a hexagonal base.
Figure 4B:
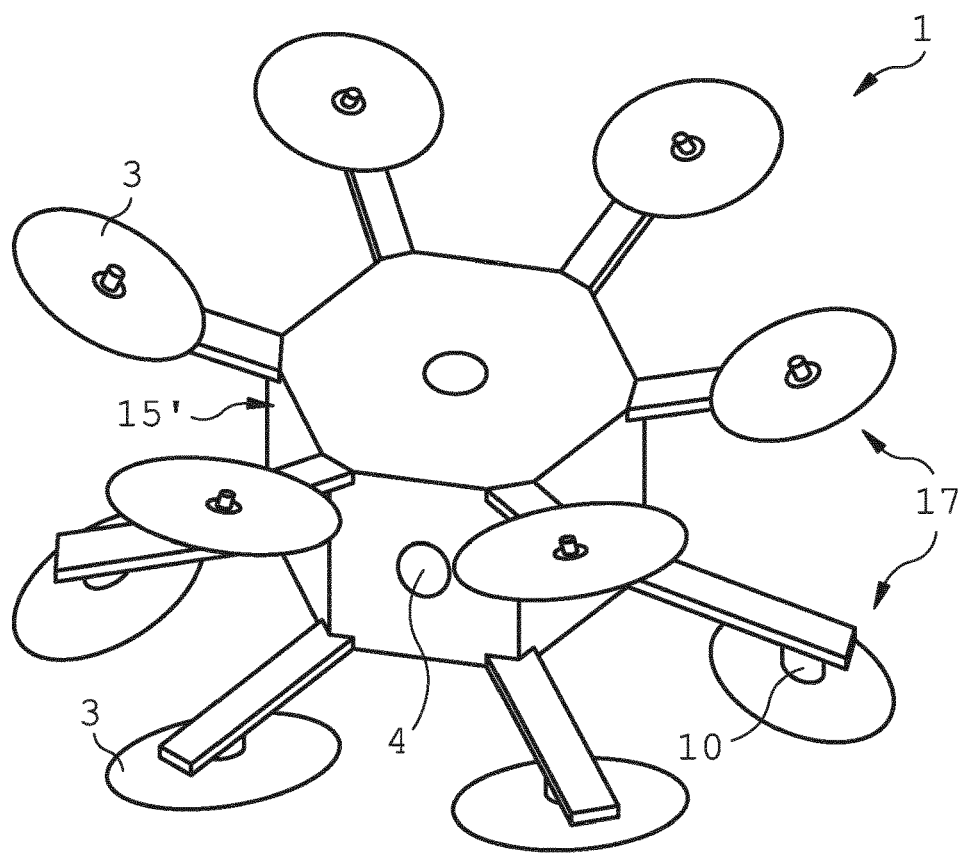
Figure 5:
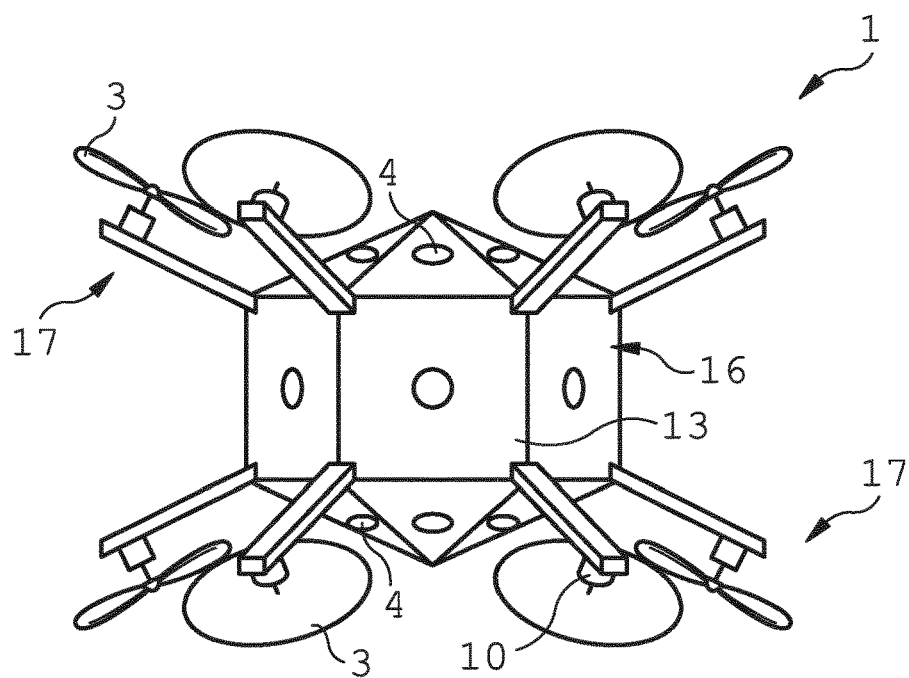
FIG. 5 is a schematically-illustrated side view of a wingless aircraft having twelve lift rotors, wherein twelve camera devices are arranged in such a way that a lens polyhedron has a prismatic body having a hexagonal base, wherein mirror-symmetrically designed pyramids are arranged on sides of the bases that are opposite to one another.
Figure 6:
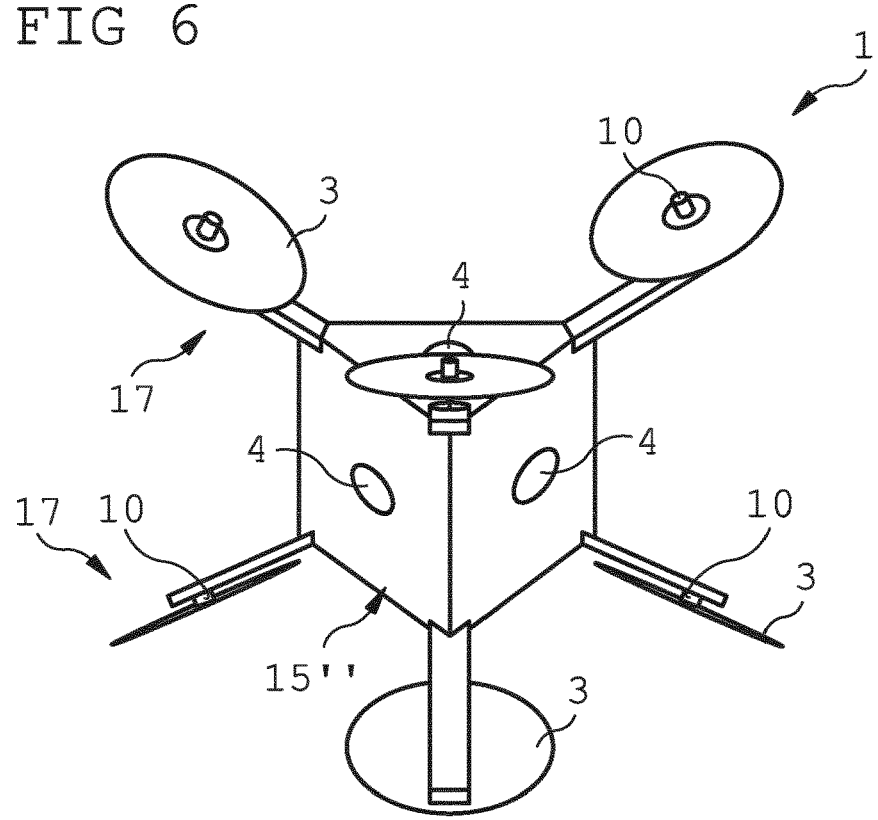
FIG. 6 is a schematically-illustrated side view of a wingless aircraft having six lift rotors, wherein five camera devices are arranged in such a way that a lens polyhedron forms a prism having a triangular base.
Figure 7:
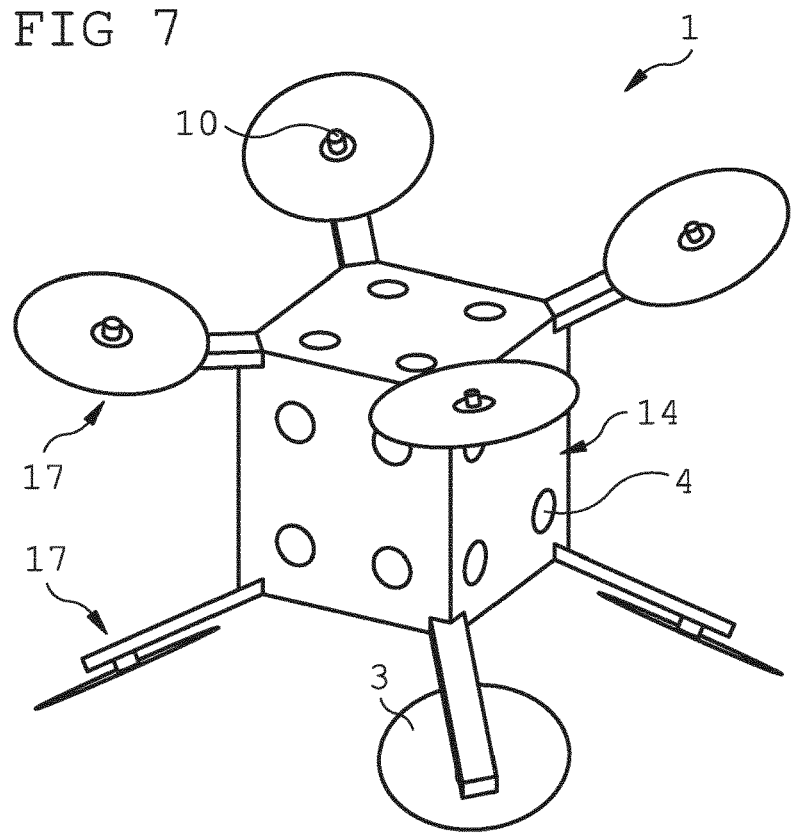
FIG. 7 is a schematically-illustrated view of a quadcopter, wherein six camera devices are arranged in such a way that a lens polyhedron is designed in a cuboid-shaped manner.

FIGS. 3a, 3b, 4a, 4b, 5 and 6 each show wingless aircraft 1 of alternative configurations, wherein the aircraft 1 illustrated in FIGS. 3a and 3b comprises a cuboid-shaped lens polyhedron 14, the aircraft 1 illustrated in FIGS. 4a and 4b comprises a prismatic lens polyhedron 15' having a hexagonal base, the aircraft 1 illustrated in FIG. 1 comprises a prism-shaped lens polyhedron 16 having a hexagonal base and with mirror-symmetrically pyramids arranged on opposite sides of the base, and the aircraft 1 illustrated in FIG. 5 comprises a prismatic lens polyhedron 15" having a triangular base. The aircraft 1 illustrated in FIGS. 3a and 3b comprises six camera devices 4, the aircraft 1 illustrated in FIGS. 4a and 4b comprises eight camera devices 4, the aircraft 1 illustrated in FIG. 5 comprises twelve camera devices 4, and the aircraft 1 illustrated in FIG. 6 comprises five camera devices 4. FIG. 7 illustrates an aircraft 1 having a cuboid-shaped lens polyhedron 14 and twenty-four camera devices 4.

The aircraft 1 illustrated in FIGS. 3a to 7 each comprise multiple lift rotors 3, wherein the lift rotors 3 can in each case be assigned to two groups 17 of lift rotors. The lift rotors 3 of the individual groups 17 of lift rotors are in each case arranged in such a way that planes extending through the lift rotor center points 10 are oriented parallel to one another per aircraft 1.

Figure 8:
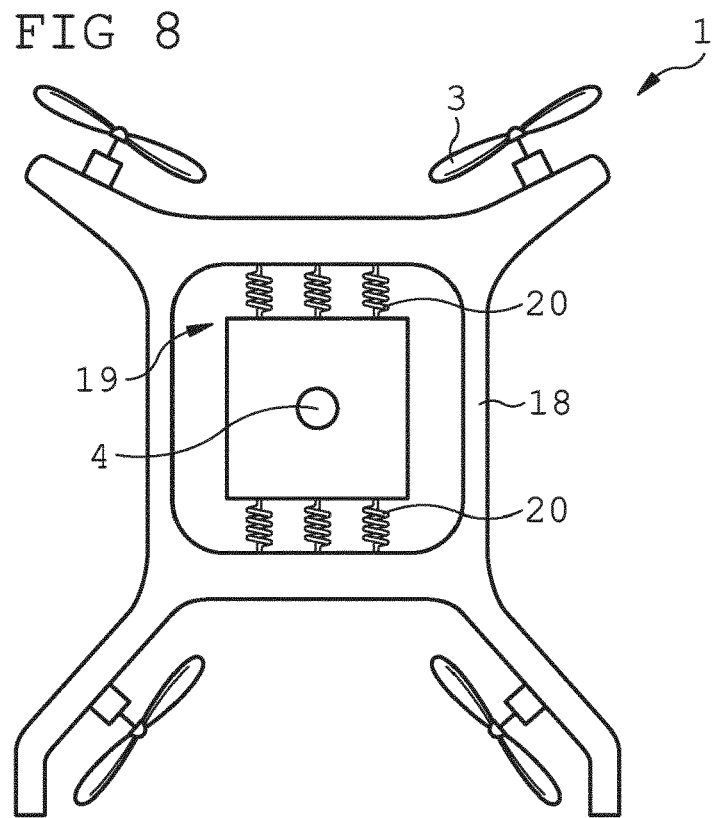
FIG. 8 is a schematically-illustrated side view of a wingless aircraft with an aircraft frame.
Figure 9A:
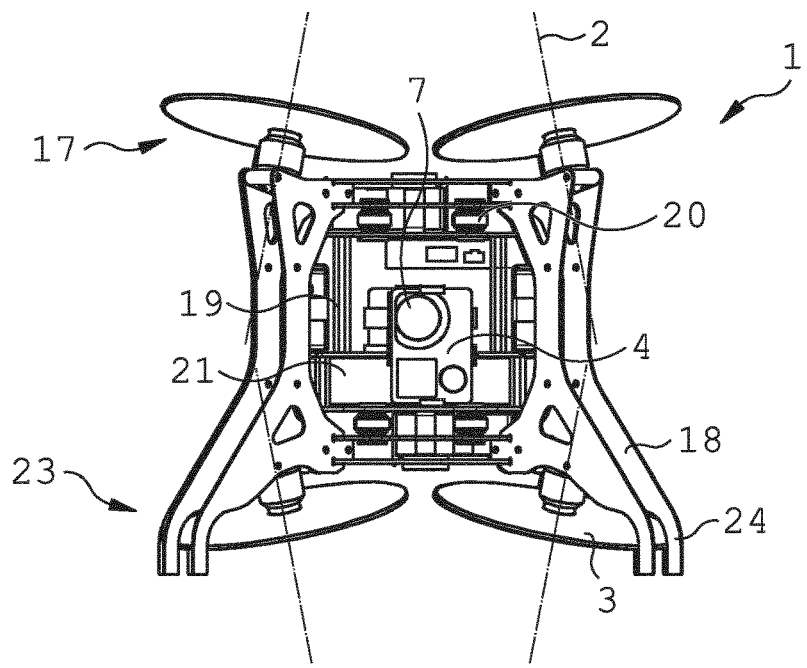
FIGS. 9a to 9d are different, schematically-illustrated views of a wingless aircraft having eight lift rotors arranged on an aircraft frame enclosing a cuboid-shaped receiving space and forming two groups of lift rotors.
Figure 9B:
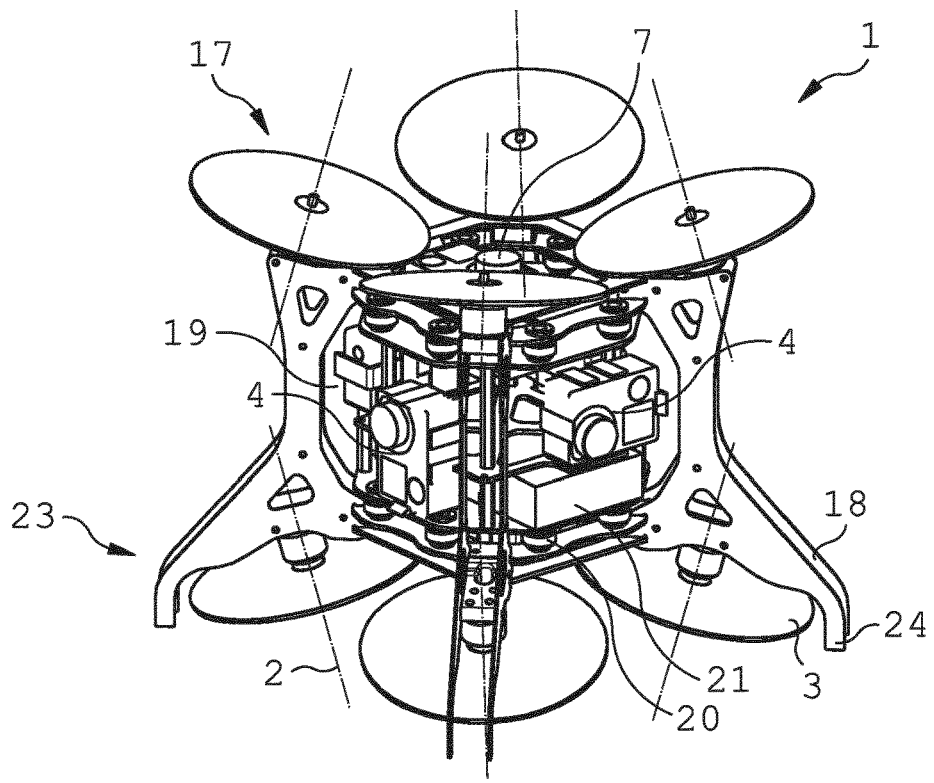
Figure 9C:
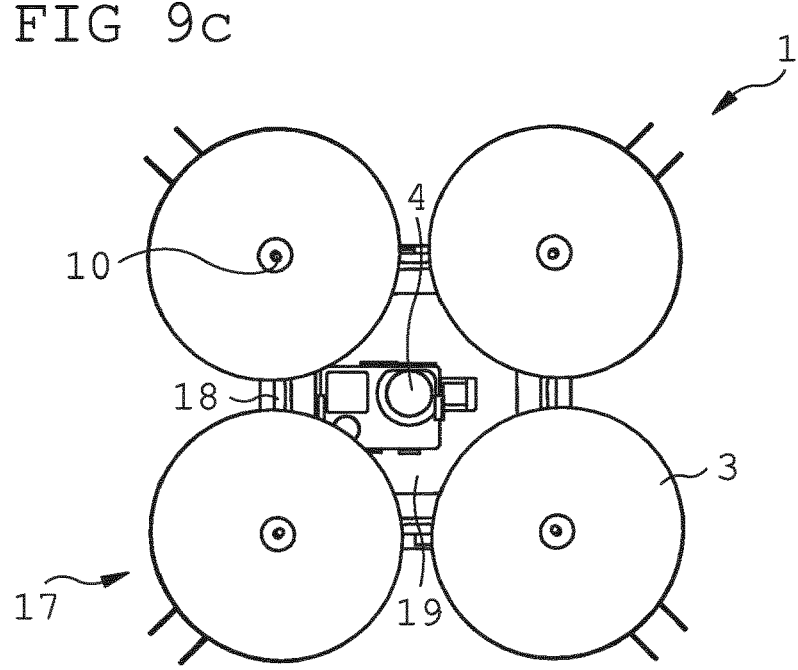
Figure 9D:
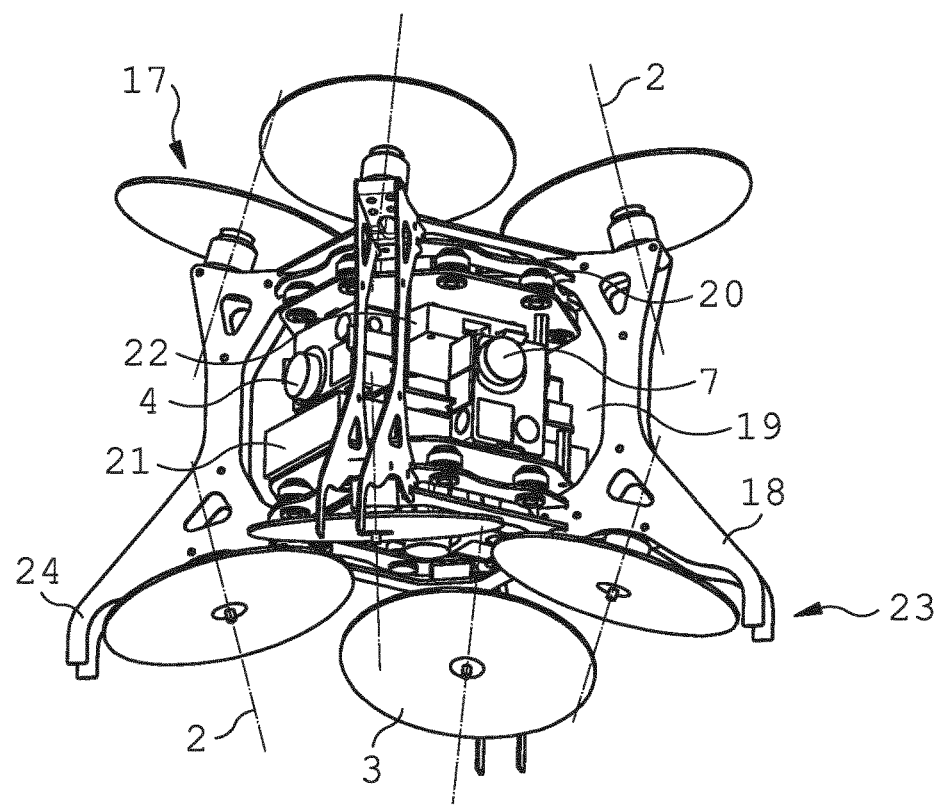
Figure 10A:
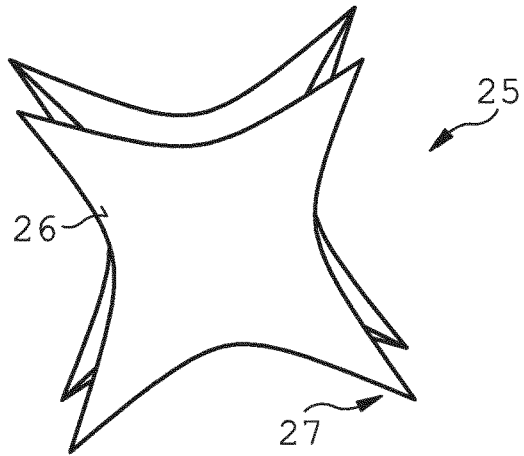
FIGS. 10a to 10e are different views of the blind space formed by the arrangement of the camera devices illustrated in FIGS. 9a to 9d.
Figure 10B:
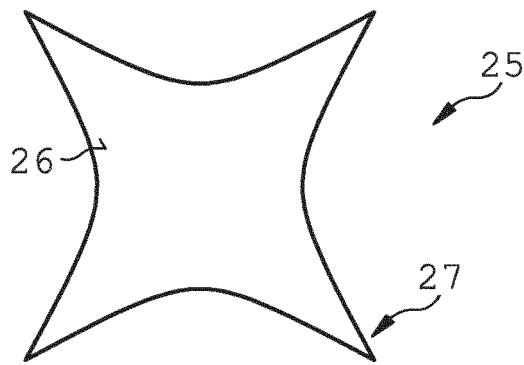
Figure 10C:
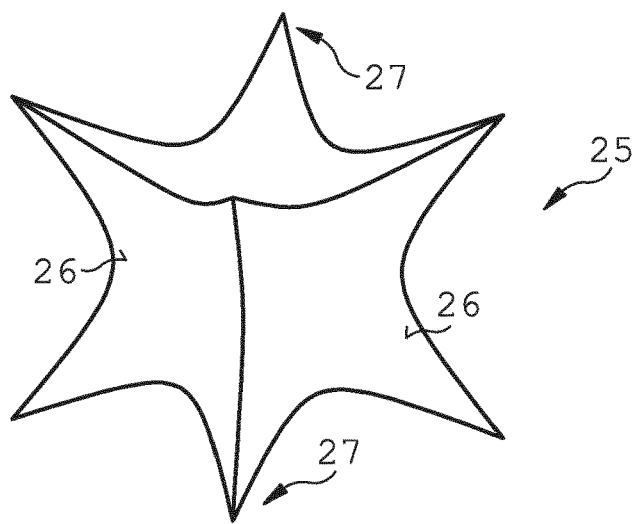
Figure 10D:
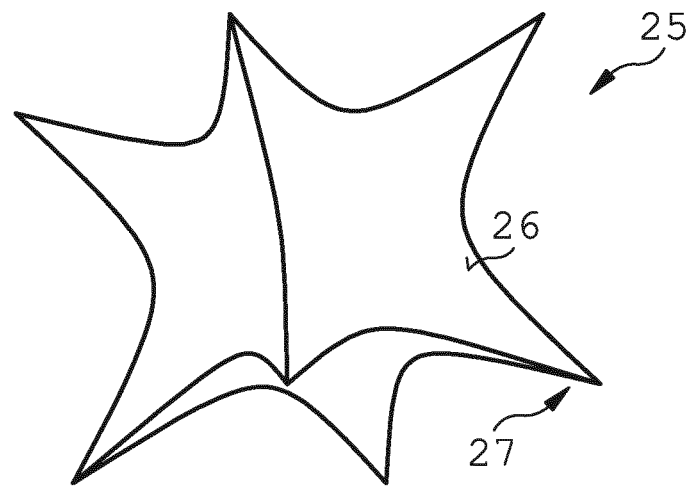
Figure 10E:
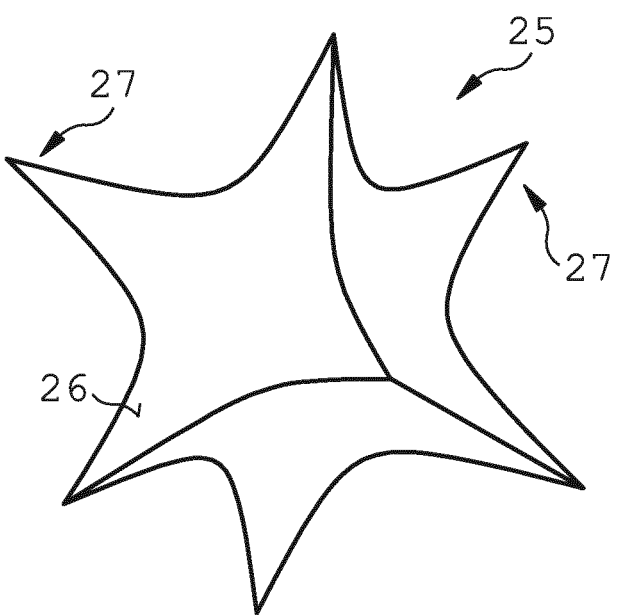

FIG. 8 shows a schematically-illustrated view of a wingless flying object 1, wherein lift rotors 3 are arranged on an aircraft frame 18 of the aircraft 1. The aircraft frame 18 encloses a receiving space 19, within which a non-illustrated energy storage, an as well non-illustrated control device and the camera devices 4 are arranged completely. The lift rotors 3 are connected with the aircraft frame 18 in a rigid manner. The energy storages, the control device and the camera devices 4 are arranged on the aircraft frame 18 via damping elements 20.

FIGS. 9a to 9d illustrate various views of a wingless aircraft 1 with an aircraft frame 18 enclosing an approximately cuboid-shaped receiving space 19. Six camera devices 4, an energy storage 21 and a control device 22 are arranged within the receiving space 19. The energy storage 21, the control device 22 and the camera devices 4 are connected to one another in a rigid manner. The aircraft frame 18 comprises support elements 24 directed towards the ground and protruding from the lift rotors 3 of the lift rotor group 23 facing the ground, by means of which support elements the aircraft 1 can be placed on to the ground.

FIGS. 10a to 10e are different views of the blind space 25 formed by the arrangement of the camera devices 4, which is illustrated in FIGS. 9a to 9d. The blind space results on the basis of fields of vision in the shape of truncated pyramids of the camera devices 4 illustrated in FIGS. 9a to 9d and comprises multiple, curved side surfaces 26, which acutely-converge in corner regions 27 of the blind space 25.

By way of the example, the depictions partially show individual components of multiple, similar-type components that carry the same reference character.

The invention claimed is:
1. A wingless aircraft with multiple lift rotors, driven by electric motors and rotating around various rotor axes, wherein the aircraft comprises
at least one energy storage for providing electrical energy necessary to operate the multiple lift rotors, at least one control device for actuating the multiple lift rotors and for communicating with a ground station, and at least two camera devices for capturing a 360 degree spherical panoramic image, wherein a smallest, spherical rotor envelope enclosing all of the multiple lift rotors has a greater volume than a smallest, spherical camera envelope enclosing camera lenses of all of the least two camera devices, and wherein the camera devices span a 360 degree spherical visual area of the entire surroundings of the wingless aircraft, with the multiple lift rotors located outside of the visual area.

2. The wingless aircraft according to claim 1, wherein the at least two camera devices comprise cameras for capturing monoscopic images and/or cameras for capturing stereoscopic images.

3. The wingless aircraft according to claim 1, wherein at least one lens-to-lens distance of the at least two camera devices from one another is less than at least one rotor-to-rotor distance of two of the multiple lift rotors from one another.

4. The wingless aircraft according to claim 1, wherein a smallest, spherical center point envelope enclosing all center points of the multiple lift rotors has a greater volume than the smallest spherical camera envelope.

5. The wingless aircraft according to claim 1, wherein all components of the aircraft lie outside of the visual area.

6. The wingless aircraft according to claim 1,
wherein the wingless aircraft comprises at least four camera devices, and
wherein the at least four camera devices are arranged and oriented to one another such that lens planes parallel to image planes of the at least four camera devices enclose a convex lens polyhedron, so that each boundary face of the lens polyhedron is located in a lens plane, and lenses of the at least four camera devices are completely arranged within the lens polyhedron.

7. The wingless aircraft according to claim 6, wherein the multiple lift rotors are arranged in a region between the visual area and the convex lens polyhedron.

8. The wingless aircraft according to claim 7, wherein the multiple lift rotors are arranged to be partially protruding into the region of the convex lens polyhedron.

9. The wingless aircraft according to claim 7, wherein the multiple lift rotors are completely arranged outside the convex lens polyhedron.

10. The wingless aircraft according to claim 6, wherein the at least one energy storage, the at least one control device and the at least four camera devices are completely arranged within the convex lens polyhedron.

11. The wingless aircraft according to claim 1, wherein at least two of the multiple lift rotors are arranged in such a way that rotor axes of the at least two of the multiple lift rotors are not oriented parallel to one another.

12. The wingless aircraft according to claim 1, wherein the multiple lift rotors are arranged on an aircraft frame of the wingless aircraft.

13. The wingless aircraft according to claim 12, wherein the aircraft frame encloses a receiving space, within which the at least one energy storage, the at least one control device and the at least two camera devices are arranged completely.

14. The wingless aircraft according to claim 12, wherein the electric motors of the multiple lift rotors and the multiple lift rotors are connected to the aircraft frame in a rigid manner.

15. The wingless aircraft according to claim 12, wherein the at least one energy storage, the at least one control device and the at least two camera devices are secured to the aircraft frame via damping elements.

16. The wingless aircraft according to claim 12, wherein the at least one energy storage, the at least one control device and the at least two camera devices are connected to one another in a rigid manner.

* * * * *